United States Patent
Engström et al.

(10) Patent No.: US 11,169,054 B2
(45) Date of Patent: Nov. 9, 2021

(54) METHOD AND SYSTEM FOR USE IN DYNAMOMETER TESTING OF A MOTOR VEHICLE

(71) Applicant: ROTOTEST INTERNATIONAL AB, Rönninge (SE)

(72) Inventors: Christian Engström, Tyresö (SE); Nils G. Engström, Rönninge (SE); Jonny Färnlund, Skärholmen (SE)

(73) Assignee: ROTOTEST INTERNATIONAL AB, Rönninge (SE)

( * ) Notice: Subject to any disclaimer, the term of this patent is extended or adjusted under 35 U.S.C. 154(b) by 83 days.

(21) Appl. No.: 16/613,142

(22) PCT Filed: May 11, 2018

(86) PCT No.: PCT/SE2018/050489
§ 371 (c)(1),
(2) Date: Nov. 13, 2019

(87) PCT Pub. No.: WO2018/212700
PCT Pub. Date: Nov. 22, 2018

(65) Prior Publication Data
US 2020/0225120 A1     Jul. 16, 2020

(30) Foreign Application Priority Data
May 16, 2017  (SE) ...................................... 1750601

(51) Int. Cl.
*G01M 17/06* (2006.01)
*G01M 17/013* (2006.01)

(52) U.S. Cl.
CPC .......... *G01M 17/06* (2013.01); *G01M 17/013* (2013.01)

(58) Field of Classification Search
CPC ........... G01M 17/007; G01M 17/0074; G01M 17/013; G01M 17/06
See application file for complete search history.

(56) References Cited

U.S. PATENT DOCUMENTS

| | | | |
|---|---|---|---|
| 4,669,318 A | * | 6/1987 | Angstrom ......... G01M 17/0072 73/862.09 |
| 5,111,685 A | | 5/1992 | Langer |
| | | (Continued) | |

FOREIGN PATENT DOCUMENTS

| | | |
|---|---|---|
| JP | 2009162627 A | 7/2009 |
| WO | 2007133154 A1 | 11/2007 |

OTHER PUBLICATIONS

International Search Report and Written Opinion in corresponding International Application No. PCT/SE2018/050489 dated Jun. 21, 2018 (8 pages).

*Primary Examiner* — Eric S. McCall
(74) *Attorney, Agent, or Firm* — Jeffri A. Kaminski; Venable LLP

(57) ABSTRACT

A method for use in dynamometer testing of a vehicle having a steering mechanism for changing steering angle of at a wheel hub connected to a first wheel shaft is provided. The method includes to apply a torque to the first wheel shaft using a first controllable dynamometer power source of a vehicle dynamometer test unit being rigidly connected to the wheel hub. A change of steering angle of the wheel hub rotates the rigidly connected first dynamometer test unit. An external force acting on the dynamometer test unit is applied to influence the force required by the vehicle steering mechanism to change steering angle of the wheel hub when changing steering angle of the wheel hub.

25 Claims, 9 Drawing Sheets

(56) References Cited

U.S. PATENT DOCUMENTS

| | | | |
|---|---|---|---|
| 5,483,823 A | | 1/1996 | Shibayama et al. |
| 6,006,611 A * | | 12/1999 | Galvin .................... G01L 3/242 |
| | | | 73/862.16 |
| 8,001,835 B2 * | | 8/2011 | Engstrom ................. G01L 3/20 |
| | | | 73/116.06 |
| 8,505,374 B1 * | | 8/2013 | Arseneau .................. G01L 3/24 |
| | | | 73/116.05 |
| 2002/0005074 A1 * | | 1/2002 | Myers .................. G01M 13/025 |
| | | | 73/862 |
| 2006/0137443 A1 * | | 6/2006 | Engstrom ............. F16K 11/085 |
| | | | 73/168 |
| 2009/0107254 A1 * | | 4/2009 | Engstrom ............. F04D 29/582 |
| | | | 73/862 |
| 2009/0126510 A1 * | | 5/2009 | Engstrom ......... G01M 17/0072 |
| | | | 73/862.14 |
| 2010/0107750 A1 * | | 5/2010 | Engstrom ......... G01M 17/0072 |
| | | | 73/116.05 |
| 2011/0303000 A1 | | 12/2011 | Engstrom |
| 2019/0368972 A1 * | | 12/2019 | Engstrom ................. G01L 3/20 |
| 2019/0383680 A1 * | | 12/2019 | Kiuchi ...................... G01L 3/16 |
| 2020/0363277 A1 * | | 11/2020 | Engstrom ........... G01M 17/007 |

\* cited by examiner

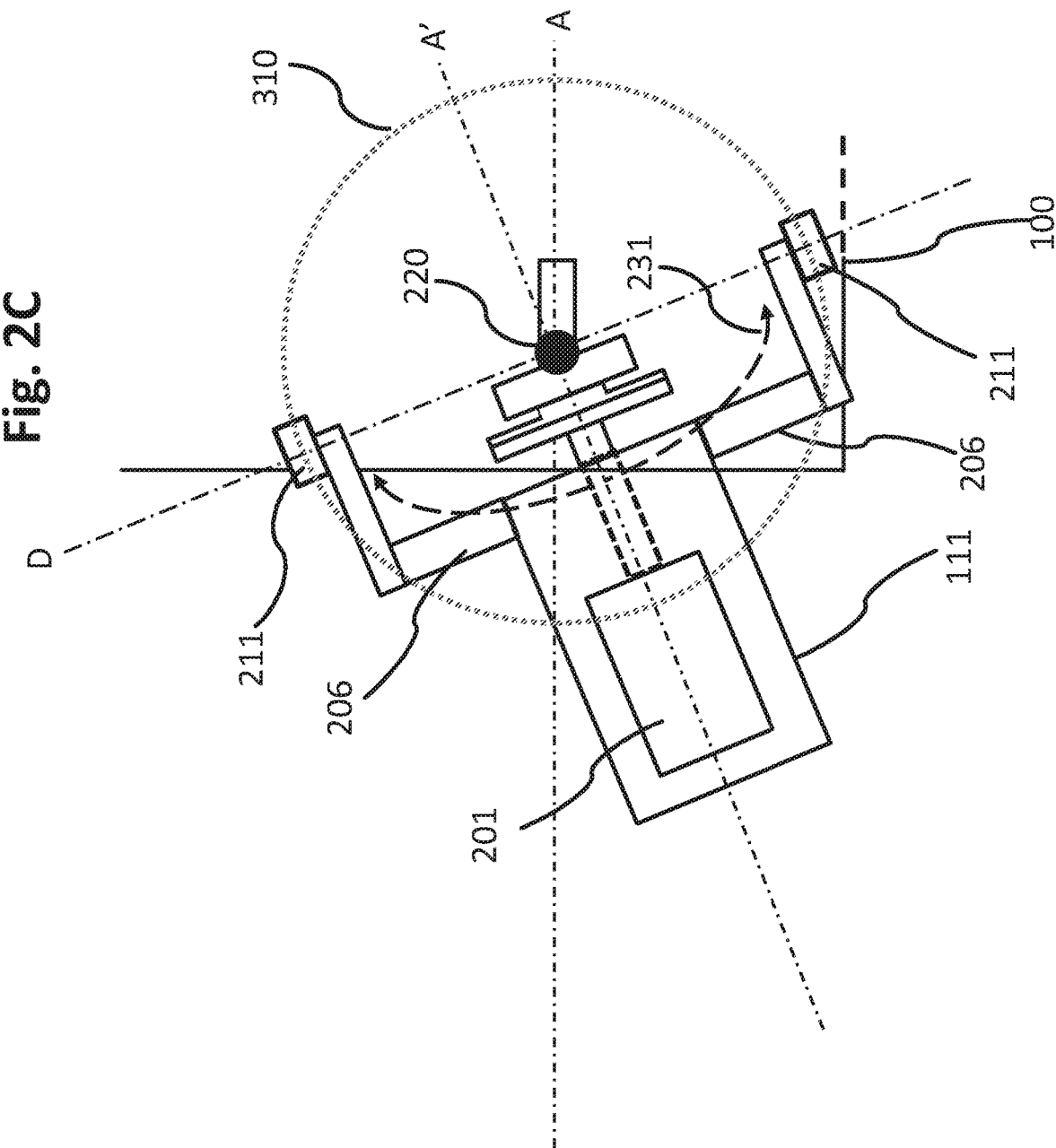

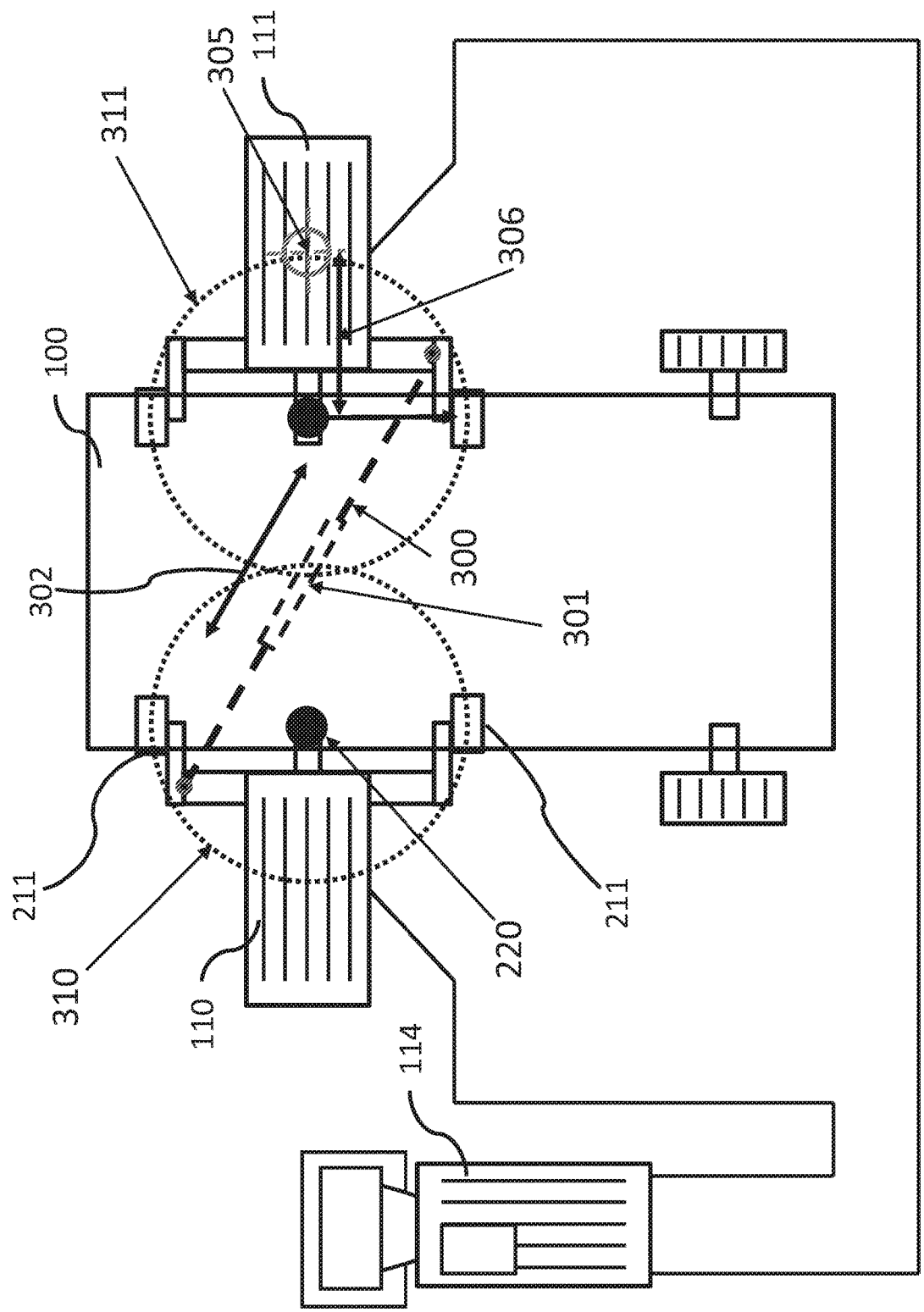

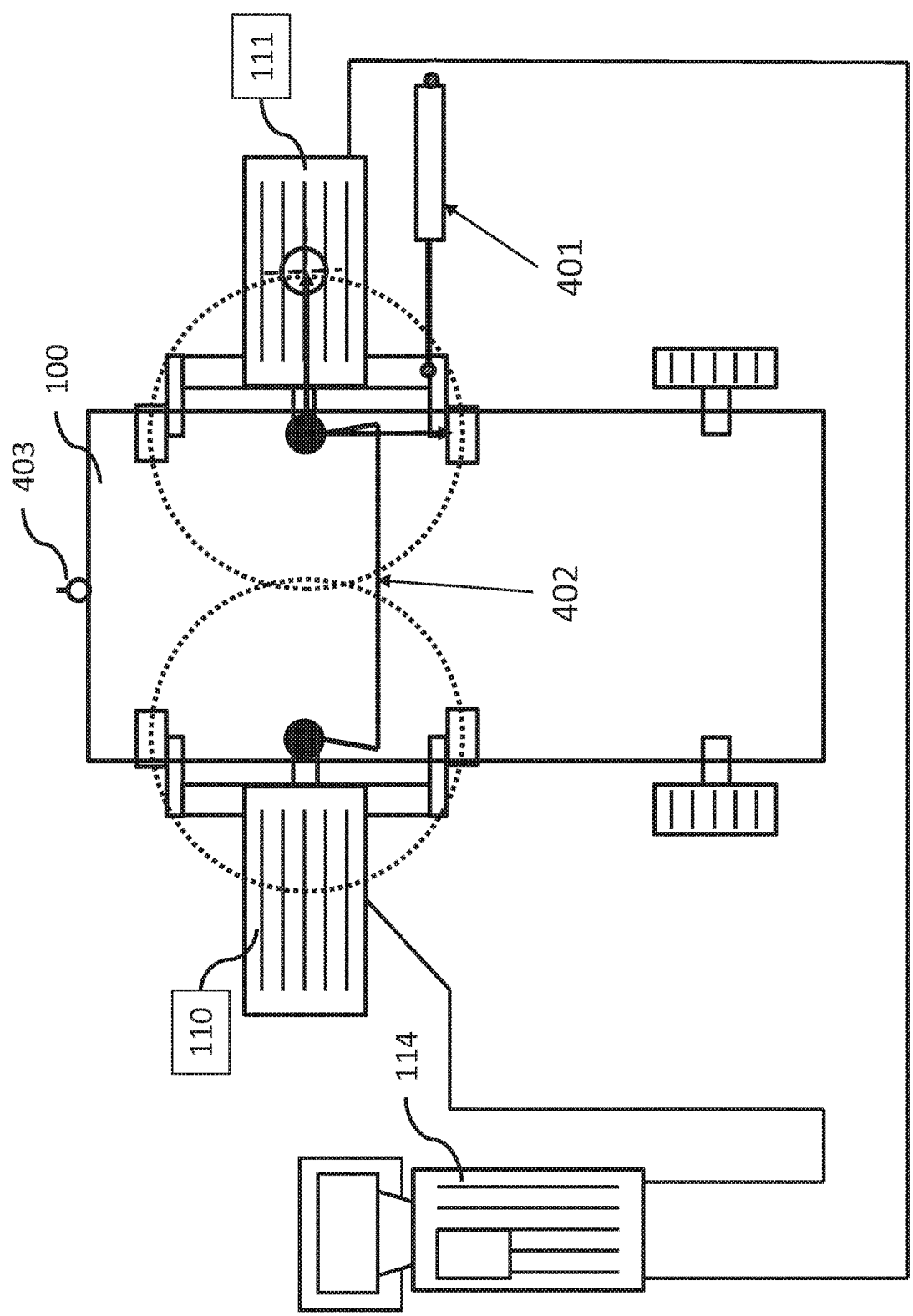

__METHOD AND SYSTEM FOR USE IN DYNAMOMETER TESTING OF A MOTOR VEHICLE__

CROSS-REFERENCE TO RELATED APPLICATIONS

This application is a U.S. National Stage application of PCT/SE2018/050489, filed May 11, 2018 and published on Nov. 22, 2018 as WO/2018/212700, which claims the benefit of Swedish Patent Application No. 1750601-5, filed May 16, 2017, all of which are hereby incorporated by reference in their entireties.

FIELD OF THE INVENTION

This invention relates to dynamometer testing of vehicles, and in particular to a method for use when dynamometer testing vehicles having at least one wheel shaft and a power source for applying power to said first wheel shaft.

BACKGROUND OF THE INVENTION

Dynamometer testing of vehicles is known per se, and can, for example, be carried out by roller type (rolling road) dynamometers equipped with large rollers that support the vehicle wheels, and which are used to apply a brake torque to the drive wheels of the vehicle. Such systems, however, are not always capable of providing the desired measurement accuracy and/or freedom of measurement.

Another kind of vehicle dynamometer systems for dynamometer testing of vehicles is disclosed in U.S. Pat. No. 4,669,318 (Angstrom). This document relates to an apparatus for dynamometer testing of vehicles, where load absorbing means in the form of a hydrostatic pump assembly has an input shaft for engagement with a drive shaft of a vehicle to be tested. Each drive shaft is fixedly connected to an individual apparatus of this kind, whereby a total effective torque from the vehicle can be accurately measured.

It is also possible to perform more complex tests using a dynamometer testing system of the kind disclosed in U.S. Pat. No. 4,669,318, both for two-wheel drive systems, and also for four-wheel drive systems. Such more complex testing is, for example, disclosed in the International patent application WO2007/133154 A1 (Engstroem).

Vehicle transmissions are becoming increasingly complex, and may include various kinds of power sources for providing power to wheel shafts of the vehicle. These power sources can be arranged to provide propelling powers, and also braking powers, e.g. when used for regenerative braking. The increased complexity of vehicle transmissions provides corresponding challenges for dynamometer testing systems. In addition, vehicles are increasingly equipped with driver assistance systems, where such systems may be utilized to aid the driver in various situations. Testing of such systems, however, may require testing in an extensive number of real-life driving situations to ensure the desired functionality. There also exist demands for testing where even further information about e.g. the vehicle engine can be obtained. The above also applies to dynamometer testing of vehicle powertrain components.

AIM AND MOST IMPORTANT FEATURES OF THE INVENTION

It is an object of the present invention to provide a method for use in dynamometer testing of vehicles that allows testing of vehicle functionality that otherwise might be difficult or impossible to test other than in real-life driving situations.

According to the present invention, it is provided a method for use in dynamometer testing of a vehicle having a steering mechanism for changing steering angle of at a wheel hub connected to a first wheel shaft, the method including:
 in use, applying a torque to said first wheel shaft using a first controllable dynamometer power source of a vehicle dynamometer test unit rigidly connected to said wheel hub,
 wherein a change of steering angle of said wheel hub rotates said rigidly connected first dynamometer test unit. The method includes, when changing steering angle of said wheel hub:
 applying an external force acting on the dynamometer test unit to influence force required by the vehicle steering mechanism to change steering angle of said wheel hub.

As was mentioned above, vehicle transmissions are becoming increasingly complex. In addition, vehicles are increasingly equipped with driver assistance systems. The driver assistance systems, may for example, be designed to automate, adapt and/or enhance various vehicle systems to increase safety and/or comfortability. For example, driver assistance systems may act to reduce the risk for collisions and/or accidents arising by offering technologies that alert the driver to potential problems, and/or influence or take over control of the vehicle.

Such driver assistance systems constitute a growing segment in automotive electronics, and this also gives rise to a need to perform accurate testing of the functionality of systems of this kind. In particular, it would be desirable to perform tests not only during real life driving on road but also using vehicle dynamometer systems.

The increased complexity of vehicle transmissions, however, provides corresponding challenges for dynamometer testing systems. The driver assistance systems may be utilized to aid the driver in various situations, which consequently may render testing of such systems a task including testing in an extensive number of real-life driving situations to ensure the desired functionality. Driver assistance systems may, for example, include systems that are designed to act and/or react at least in part on changes relating to vehicle steering. For example, such systems may include swiveling curve lights that follows steering, turning assistants, anti-skid braking systems etc.

It would be desirable to test also systems of these and other kinds where vehicle steering is an input parameter to the system, in particular when dynamic changes to the steering occur. The present invention relates to vehicle dynamometer systems of the kind where, in use, torque is applied to a wheel shaft of the vehicle being tested by using a first controllable dynamometer power source of a vehicle dynamometer test unit, where the dynamometer test unit is rigidly connected to the wheel hub.

When a vehicle that is tested using this kind of vehicle dynamometer is subjected to a steering angle change, i.e. steering direction change, e.g. by turning a steering wheel of the vehicle or otherwise causing a steering angle change to the wheel hub, this would cause a steering angle change of a wheel of the vehicle in order to change direction of travel of the vehicle if the vehicle were driven on a road. During testing, instead, the dynamometer test unit is rigidly connected to the wheel hub in place of the wheel, which means that an angular change of the wheel hub will rotate (turn) the dynamometer test unit, i.e. the dynamometer test unit will be rotated in a horizontal plane on the surface upon which it is resting and about a substantially vertical rotation axis located in the pivot point of the wheel hub. The dynamometer test unit will hence be moved in a horizontal plane.

The dynamometer test units may have a significant weight, e.g. at least partly as a result of the e.g. one or more power sources carried by the dynamometer test unit, where the one or more power sources may comprise an electrical machine and/or a hydraulic pump assembly. This weight, in combination with the distance from the wheel hub to the center of gravity of the dynamometer test unit, which may differ substantially from the distance to the center of gravity of a wheel when attached to the wheel hub, result in the dynamometer test unit applying a force/torque that act against turning the wheel hub when changing steering angle, and which substantially differs from the torque that the wheel hub is subjected to when a wheel is attached, such as e.g. when driving on a road. This torque difference may have an impact on, and may also hinder, desired testing of e.g. driver assistance systems. For example, the force acting against changing steering angle perceived by the vehicle steering mechanism may be considerably higher than when turning a wheel. The vehicle steering mechanism may e.g. be a power steering mechanism.

According to the invention, the difference in force/torque that the vehicle steering mechanism is subjected to when changing vehicle steering angle may be mitigated by influencing the force required to turn the wheel hub to change steering angle of the vehicle when a dynamometer test unit is rigidly connected to the wheel hub. This is accomplished by applying a vehicle external force acting on the dynamometer test unit. In this way, the force/torque against turning imposed by the dynamometer test unit can e.g. be changed by applying a force that strives to rotate the dynamometer test unit on the surface upon which it is resting. Thereby the force required by the vehicle steering mechanism to accomplish the actual turning of the wheel hub, and thereby rotate dynamometer test unit, may more resemble the force required when the vehicle wheel is attached.

The applied external force may act to rotate the dynamometer test unit when changing steering angle of said wheel hub in the direction of motion the dynamometer test unit is being rotated by the wheel hub to thereby reduce the force that is required by the vehicles steering mechanism to accomplish the desired change in steering direction of the vehicle. The applied external force may thereby reduce the force required by the vehicle steering mechanism to change steering angle of said wheel hub. In this way, the greater force against turning that the dynamometer test unit imposes in relation to when the vehicle wheel is attached can be compensated for. Thereby, e.g. turning a steering wheel during dynamometer testing may feel similar to when driving on a road. In particular, dynamic/rapid steering angle changes, such as when rapidly requesting steering angle change using a steering wheel may be performed using the external force applied according to the invention.

The external force that is applied to the dynamometer test unit may be determined in dependence on a vehicle speed being simulated during dynamometer testing. In general, the resistance against turning that the vehicle wheel imposes on the vehicle steering mechanism differs with different vehicle speeds, and this can be compensated for by applying different forces for different simulated vehicle speeds.

The dynamometer test units may further be provided with means for measuring the torque that the dynamometer test unit is subjected to when being turned/moved by steering angle changes of the wheel hub. This may be performed using any suitable means for measuring this torque, and, may, for example, be accomplished by measuring the torque that the output shaft of the dynamometer test unit is subjected to. This may be determined in various manners, e.g. using strain gauges on the bearing housing in which the output shaft of the dynamometer test unit is placed in bearings.

The measured torque may then be utilized when applying the external force, so that the external force can be controlled using the torque experienced by the dynamometer test unit as input signal, to thereby allow accurate and essentially real-time control of the resistance against motion experienced by the vehicle steering system.

The torque may also be represented by a force measured e.g. using sensors arranged on the force applying means, where the force applying means can be arranged to provide a force in the same direction as the sensed force, e.g. a force at most corresponding to the sensed force, and having a magnitude being dependent on the sensed force.

In this way, for example, when simulating driving of a vehicle at relatively low speeds it may be desired to provide a very low resistance against turning of the wheel, and by measuring the torque that the dynamometer test unit is subjected to, the means for applying the external force may e.g. be controlled to substantially reduce or essentially completely compensate for the torque exhibited by the dynamometer test unit, so that essentially no torque is exhibited by the steering mechanism of the vehicle.

According to embodiments of the invention, a higher external force may be applied to the dynamometer test unit for a first simulated vehicle speed than for a second, lower than said first, simulated vehicle speed such that the force required by the vehicle steering mechanism to change steering angle of said wheel hub is lower for said first simulated higher vehicle speed than for said second simulated lower vehicle speed. The force against turning during real life driving is in general higher at lower vehicle speeds, and may be the highest at standstill. Such differences can be compensated for in the dynamometer testing of the vehicle to obtain a steering resistance that more corresponds to the actual real life steering resistance of the simulated vehicle speed.

According to embodiments of the invention, a higher external force is applied for a first speed of change of the steering angle of the wheel hub in comparison to an applied external force for a second, lower than said first, speed of change of steering angle. Due to the weight of the dynamometer test units, these may give rise to a substantial moment of inertia when rapidly being rotated, thereby subjecting the vehicle steering to an even higher counteracting force e.g. when rapidly turning the steering wheel of the vehicle. This can be compensated for by increasing the applied external force when rapid changes in steering angle are performed.

According to embodiments of the invention, a first dynamometer test unit is arranged to a first, and a second dynamometer test unit to a second, wheel shaft of a steering, e.g. front, axle of a vehicle, wherein said force applying means is configured to simultaneously apply a force to both dynamometer test units so that that both wheel shafts are simultaneously affected by a force influencing the resistance against changing steering angle exhibited by the vehicle steering mechanism.

The force to be applied by the force applying means may e.g. be determined using a mathematical representation of the force that act between the wheel of the wheel shaft, when the wheel is attached, and the surface, e.g. road, upon which the vehicle is being maneuvered, so that during testing a force can be applied that results in a steering resistance exhibited by the vehicle that corresponds to the force exhibited had the vehicle being driven on a road at the speed and not being simulated by the vehicle dynamometer.

The force may be applied by any suitable kind of force applying mechanism that is capable of applying a force acting to turn the dynamometer test unit to thereby influencing the resistance exhibited by the steering mechanism of the vehicle when changing steering angle during testing of the vehicle.

For example, the force can be applied by a linear actuator, such as e.g. a pneumatic, hydraulic or electrical cylinder. Alternatively, or in addition, the force may be applied by propelling one or more wheels of the dynamometer test unit.

Furthermore, there may exist a desire to know the degree to which the wheels of the vehicle have actually turned during testing e.g. as a result of a turning of the steering wheel of the vehicle. This may be difficult to determine from a determination of a turning of the vehicle steering wheel.

According to embodiments of the invention, a steering angle and/or steering angle change of the wheel hub, and thereby a representation of the vehicle wheel of the vehicle being tested is determined by determining the turning motion of the dynamometer test unit. In this way an accurate measurement of the vehicle steering angle may be determined.

The determination of the motion of the dynamometer test unit may be performed, for example, by determining a motion of the force applying means. This motion may be translated in a straight forward manner to a corresponding turning angle.

The determination of the motion of the dynamometer test unit may alternatively, or in addition, be performed, for example, using motion detecting means arranged on the dynamometer test unit. Also, the determination of the steering angle change may be performed using a laser, where e.g. a range finding laser may be arranged on the dynamometer test unit and be arranged to measure a distance e.g. to the vehicle or any other suitable surface. The difference in distance that arises when the dynamometer test unit is turned may then be used to calculate the steering angle change. Also, laser measuring technology being used e.g. when adjusting wheel alignment of vehicle wheels may be used.

The method can be performed in a vehicle dynamometer system where the dynamometer test units are of a kind having an electrical machine as power source. The dynamometer test units may also have controllable hydraulic pumps for controlled braking so as to apply a braking torque to wheel shafts of a motor vehicle during the testing process.

The support means contacting the surface upon which the dynamometer test unit is resting may comprise wheels, such as e.g. swivel wheels, but may also comprise any other suitable means that allow movement of the dynamometer test unit on the surface upon which it is resting according to the invention. The support means may be designed to provide a relatively low friction against motion of the dynamometer test units to facilitate movement according to the invention.

According to embodiments of the invention, the vehicle may be tested without being secured to the surface upon which it is being tested. This may be the case, for example, when the sum of the force components applied to the dynamometer test units according to the invention are essentially zero in a lateral and/or longitudinal direction of the vehicle so that essentially no net force is applied to the vehicle. This may e.g. be the case if similar but opposite forces components are simultaneously applied e.g. to a left and a right dynamometer test unit, respectively.

According to embodiments of the invention, the vehicle may be tested while being secured in relation to the surface upon which it is resting in order to reduce or prevent substantial lateral motion of the vehicle. This may be performed, for example, by securing the vehicle using e.g. tow hooks and/or tow bar of the vehicle and suitable straps such as ratchet straps. It may be required to secure the vehicle e.g. if the force applied to the dynamometer test units provide a resultant force component e.g. in a lateral direction. This may be the case, for example, if a vehicle external force is only applied to one dynamometer test unit.

Furthermore, vehicles may comprise more than one axle provided with steering wheels. For example, a vehicle may comprise four-wheel steering. According to embodiments of the invention, dynamometer test units are connected to a plurality of steered axles and being controlled according to embodiments of the invention. For example, a vehicle where e.g. one or more wheels of a front axle and one or more wheels of a rear axle of the vehicle comprise steered wheels, may be tested using dynamometer test units connected to both front axle and rear axle, where the dynamometer test units are controlled according to the invention. For example, a four-wheel steered vehicle may be tested using four dynamometer test units being controlled according to the invention.

The dynamometer test unit may also be of a kind having two (or more) dynamometer power sources for providing power to a same wheel shaft, such as e.g. a half shaft, of the vehicle, where one of said power sources can be an electrical machine.

Further features of the present invention and advantages thereof will become clear from the following detailed description of illustrative embodiments and from the attached drawings.

BRIEF DESCRIPTION OF DRAWINGS

The invention will now be described in greater detail with reference to the drawings, wherein:

FIG. 2C illustrates turning of a dynamometer test unit, FIG. 3 illustrates an exemplary vehicle dynamometer test system according to embodiments of the present invention, FIG. 4 illustrates a further exemplary vehicle dynamometer test system according to embodiments of the present invention.

DESCRIPTION OF EXEMPLARY EMBODIMENTS

Figure 1:
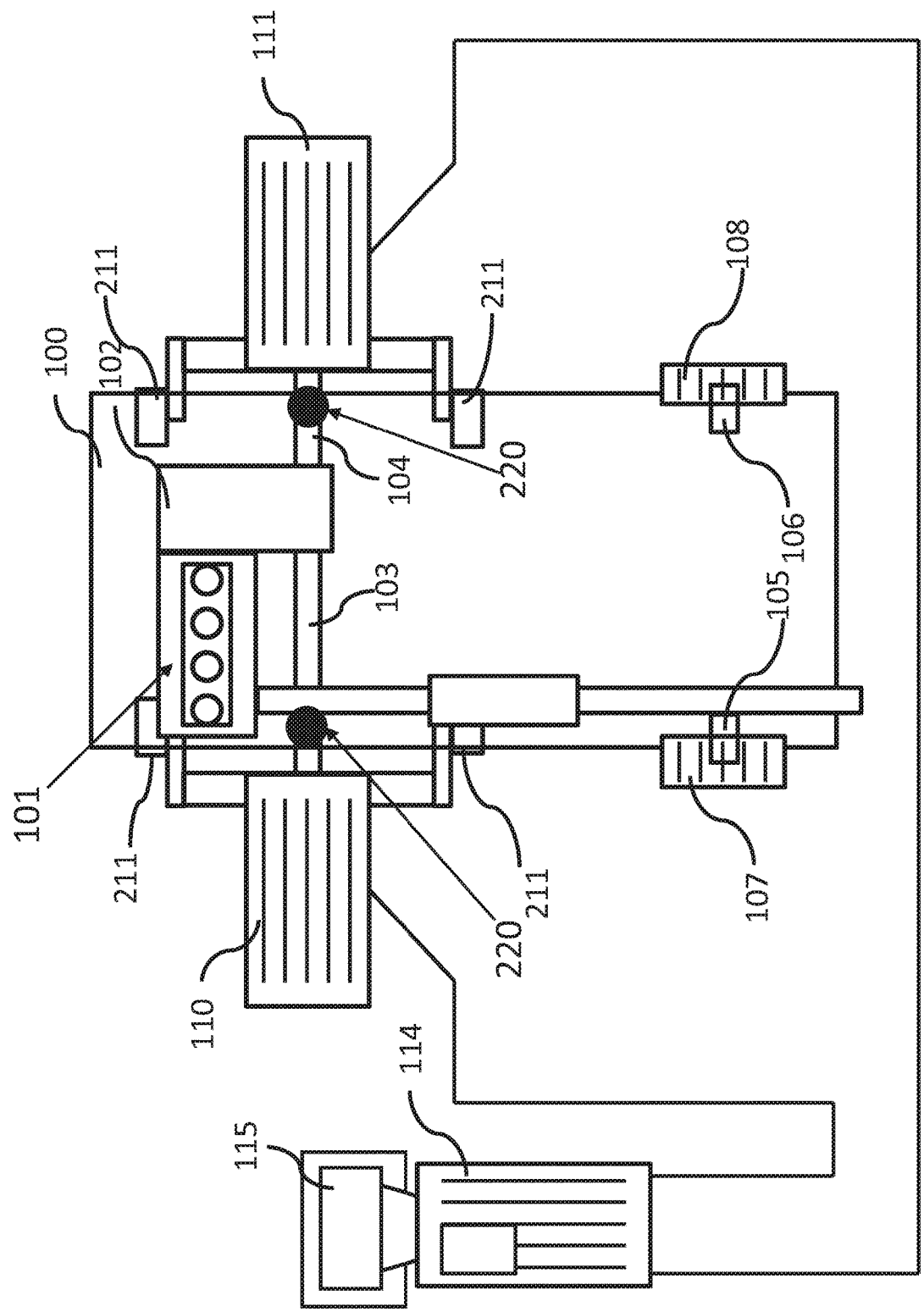
FIG. 1 illustrates an exemplary vehicle dynamometer system according to the present invention.

FIG. 1 discloses a vehicle 100 set up for being tested with a vehicle dynamometer system according to the present invention.

The vehicle 100 is a two-wheel (front wheel) drive vehicle, and includes front axle wheel shafts, or half shafts, 103, 104, and rear axle wheel shafts 105, 106.

The disclosed vehicle 100 includes a drive train, which includes a combustion engine 101 connected to a gearbox 102. The gearbox 102 can be of any suitable kind and, e.g., consist of a manual transmission or an automatic transmission. The front axle wheel (drive) shafts, such as half shafts, 103, 104 extend from the gearbox to the front axle wheels of the vehicle 100. FIG. 1 only discloses rear axle wheels 107, 108, whereas the front axle wheels have been removed to allow the dynamometer test units 110, 111 to be connected to the half shafts 103, 104 in place of the wheels according to the below.

A vehicle dynamometer system is connected to the vehicle 100, and includes dynamometer test units 110, 111. The dynamometer test units 110, 111 are connected to a measuring and control system 114, such as e.g. a computer with associated display 115, by means of which the tests are controlled, and by means of which an operator of the system may initiate tests and provide necessary information for performing the dynamometer tests.

During testing, the measuring and control system 114 transmits control signals to the dynamometer test units 110, 111 to request desired load (torque) and rotational speed. Torque and rotational speed can be measured in different ways, e.g. according to earlier applications of the assignee of the present application. The dynamometer test units 110, 111 may consist of substantially identical test units, and are described slightly more in detail with reference to FIGS. 2A-B.

Figure 2A:
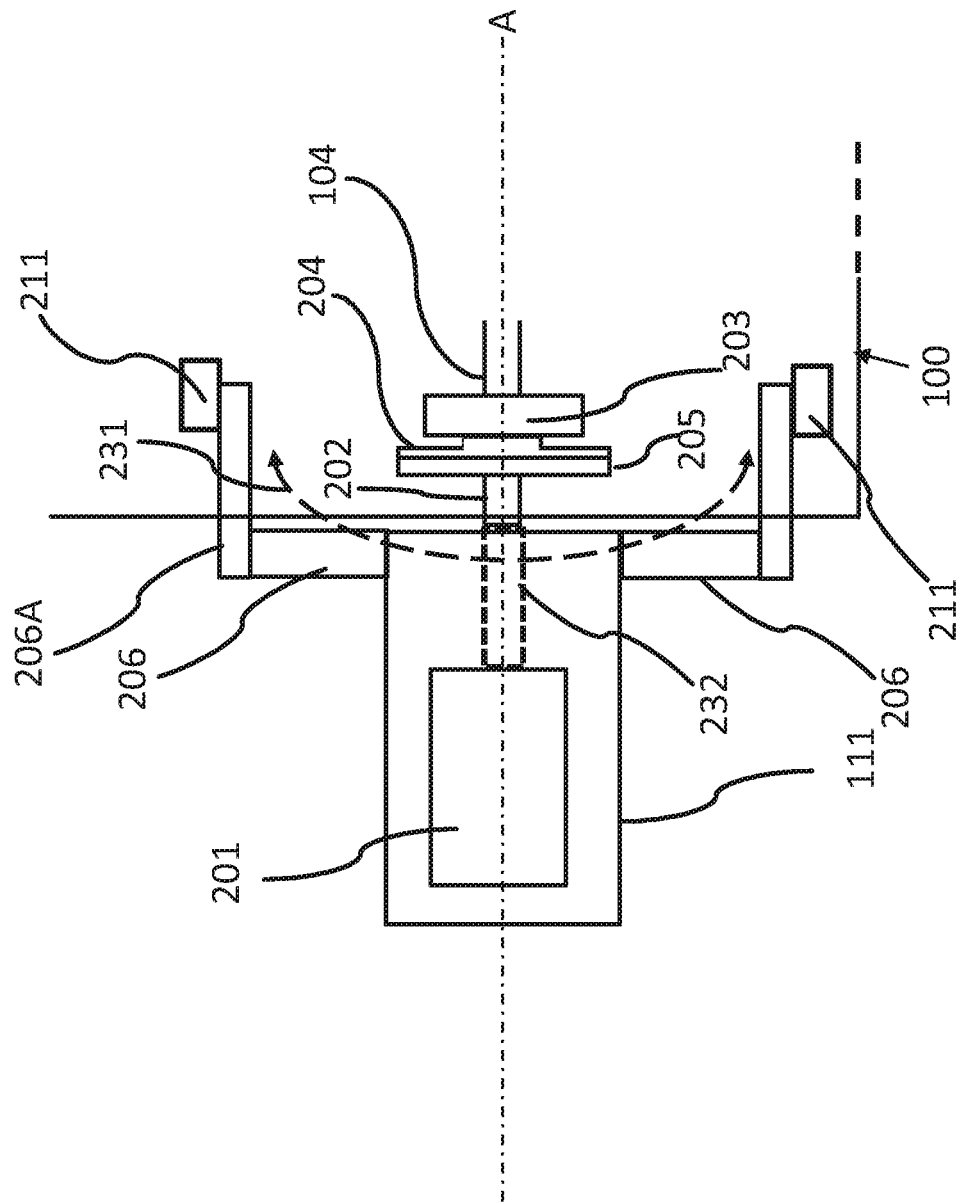
FIGS. 2A-B illustrates a dynamometer test unit of the system disclosed in FIG. 1 more in detail.

FIG. 2A shows an example of the set-up for one half shaft more in detail as seen from above. Each dynamometer test unit 110, 111 includes a dynamometer in the form of a power source assembly, for example one or more electrical machines 201. The power source assembly is further provided with means for measuring the torque applied to an output shaft 202 of the test unit 111. The use of an electrical machine as power-absorbing means in the dynamometer is only exemplary. The invention may also be realized using other types of power-absorbing means. For example, an hydrostatic pump assembly may be utilized as power source of the test unit 111 to apply torque to the wheel shaft 104 of the vehicle. A combination of power sources may also be utilized in each test unit, i.e. plural power source may be utilized to apply torque to a wheel shaft. For example, a dynamometer test unit may comprise any combination of one or more hydrostatic pump assemblies and/or one or more electrical machines being connected to a single wheel shaft. Examples of such solutions are also described in earlier applications having the same applicant and/or inventor(s) as the present application.

The dynamometer further comprises support legs or arms 206 carrying the weight of the elements of the test unit supported thereby as well as a portion of the weight of the vehicle being tested. The support legs further carries the torque applied to the dynamometer by the driven vehicle shaft 104 and prevents the test unit from rotating about the rotation axis A of the wheel shaft and dynamometer test unit output shaft. Exemplary designs of the dynamometer test unit and vehicle dynamometer system can be found in previous applications from the applicant and/or inventors of the present application. An exemplary design is also schematically shown from the side in FIG. 2B, which also shows part of the vehicle wheel steering mechanism.

During testing, the output shaft 202 of the test unit 111 is arranged to be rigidly connected to the wheel shaft 104 of the vehicle 100 (similarly, the output shaft of the test unit 110 is arranged to be rigidly connected to the wheel shaft 103). The rigid connection is accomplished by removing the vehicle wheel and attaching the output shaft 202 of the dynamometer test unit to the wheel hub 203 directly or, as in the present example, using an adapter plate 204, so as to obtain a rigid connection between vehicle 100 and dynamometer test unit 111 in a simple manner. The adapter plate 204 may be adapted to fit the wheel-carrying end of the half shaft 104 of the car 100 and to be secured by fasteners in place of the rim of the wheel.

The adapter plate 204 is further fixedly connected to the output shaft 202 of the dynamometer test unit 111. This can be accomplished, for example using a circular coupling flange 205 which e.g. can be welded to a clamped-on collar on the output shaft 202. The adapter plate 204 is rigidly but releasably secured by means of fasteners such as bolts to the coupling flange 205. The adapter plate 204 is further arranged to be axially aligned with the coupling flange 205 so that the half shaft 104 thereby also is aligned or substantially aligned with output shaft 202, the output shaft 202 and half shaft 104 thereby being rotationally locked to each other. The rigid connection has, inter alia, the advantage that rotational speed of the wheel shaft can be measured by a suitable sensor measuring rotational speed of the output shaft 202 of the electrical machine 201. Wheel hub 203, adapter plate 204 and coupling flange 205 are identified both in FIG. 2A and FIG. 2B.

The dynamometer test units 110, 111, which e.g. can be standing freely on a floor 230, are thus connected to the vehicle only by means of a (rigid) coupling to the wheel shafts (wheel hubs) (and possibly some kind of electronic wire connection for communication with the vehicle control system), and are also supporting, i.e. carrying the weight of the vehicle in place of the wheel that has been taken off.

Figure 2B:
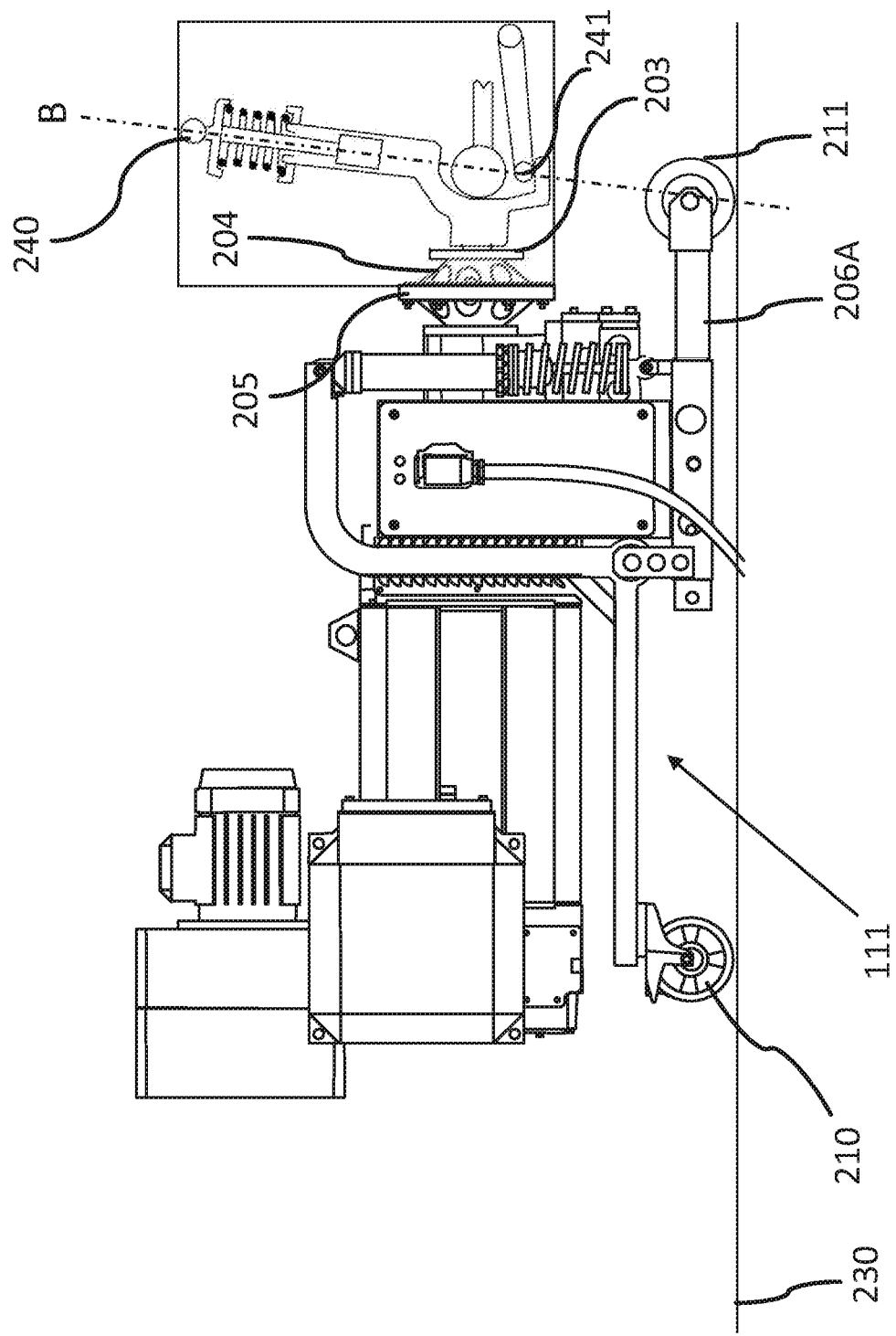

As can be seen from FIG. 2B, the dynamometer test units 110, 111 are further resting on the floor 230 through supporting means, in this example wheels 210, 211 (the wheels 211 are schematically indicated also e.g. in FIGS. 1 and 2A) to facilitate maneuvering of the dynamometer test units 110, 111, e.g. to position them in relation to the vehicle/wheel shaft to be tested. Testing of vehicles may be performed without changing steering angle of the vehicle, but, as was mentioned above, there may also be situations where it is desired to perform steering angle changes during testing. Oftentimes vehicles are provided e.g. with anti-skidding systems or similar functionality, and/or automatic parking functionality, and/or swiveling curve lights that at least to some extent follows the steering angle of the wheels and/or various other possible kinds of systems that are influenced by or that influences the vehicle steering angle during operation.

If a steering angle change is applied to the front wheel shafts e.g. by turning the steering wheel of the vehicle 100, this will turn the wheel hub 203 and wheel when attached. In this case, the rigid connection between the dynamometer test unit 111 and wheel shaft 104 will cause the dynamometer test unit 111 to be subjected to a rotating motion to follow the change in steering angle of the wheel hub.

This turning motion will occur about a relatively vertical axis, indicated by "B" in FIG. 2B, e.g. defined by the axis passing through the center of the upper support 240 of the spring strut and joint 241 of the kingpin/steering knuckle/steering spindle allowing turning of the wheel hub 203. This joint is schematically indicated from above by 220 in FIG. 1. A turning motion of the wheel hub, e.g. to simulate a steering angle change, will therefore result in a relocation of the dynamometer test unit 111 on the floor upon which it is resting as the test unit 111 is rotated about the center of rotation defined by axis B. An exemplary resulting relocation (rotation) of the dynamometer test unit 111 caused by being rotated following turning of the wheel hub is illustrated in FIG. 2C, where the dynamometer test unit 111 has been rotated about the center of rotation 220 from a position represented by axis A by an angle represented by the angle between axis A and axis A'.

The possibility of allowing maneuverability of the dynamometer test units in this manner may hence provide additional possibilities when testing the vehicle since vehicle systems being influenced by vehicle steering angle may also be tested. However, the steering resistance that the vehicle steering mechanism is subjected to when a dynamometer test unit is turned instead of a wheel when changing steering angle may differ substantially from the steering resistance experienced when the vehicle wheel is in place. This is due to the in general considerably larger mass of the dynamometer test units in comparison to the mass of the wheels, and also the distance to the center of gravity 305 (see FIG. 3) of the dynamometer test unit, and the distance 306 to this center of gravity from the joint 220. The steering resistance that the vehicle steering mechanism is subjected to may differ substantially in particular when rapid changes in steering angle is performed, since in such cases the dynamometer test unit will exhibit a high moment of inertia acting against the turning motion due to the weight and distance 306 from joint 220 to the center of gravity 305 which in general is at a considerably further distance from the wheel hub than when the center of gravity of an attached wheel. Also, the friction between the dynamometer wheels and the surface upon which they are resting has an influence. Consequently, steering manoeuvers will feel different, in particular during dynamic (rapid) steering angle changes, than when performing similar steering manoeuvers when driving on a road.

According to embodiments of the invention, testing of vehicle functionality involving steering angle changes can be effected using an external force acting on the dynamometer test unit to change the effort required by the vehicle steering mechanism to turn the dynamometer test unit, so that the required effort more resembles real life vehicle behavior when the vehicle is traveling on a road. This is accomplished by applying an external force acting on the dynamometer test unit when changing steering angle and which influences the force required to be applied by the wheel hub to turn the dynamometer test unit when changing steering angle. In this way the resistance against steering exhibited by the vehicle steering mechanism may resemble more the force applied by the wheel during real life driving than the force the steering mechanism otherwise would be subjected to during testing. In particular, when simulating driving at vehicle speeds being different from zero and/or when applying rapid steering angle changes, the force against turning the "wheel" may, due to the moment of inertia discussed above, differ substantially from the force experienced during real life driving, and the resistance against turning applied by the vehicle dynamometer units may also make desired testing impossible due to desired turning motions not being possible to accomplish.

As was mentioned, according to embodiments of the invention, an external force is applied to account at least in part for such differences, and a first example of a system according to embodiments of the invention rendering this possible is disclosed in FIG. 3.

FIG. 3 illustrates a similar vehicle dynamometer set-up as is illustrated in FIG. 1, i.e. a system set up for dynamometer testing of a front-wheel-drive vehicle 100. Drivetrain components have been omitted to increase clarity. As discussed above, the vehicle steering spindles, or steering knuckles, i.e. the joints 220, allow the wheel hubs, and thereby, in this case, the dynamometer test units to turn about the joints 220 in place of the vehicle wheels being turned during driving on a road. Circles 310 and 311 have their centers in the steering knuckles, respectively, and as can be seen from FIG. 3 support legs 206 (FIG. 2A) and/or support means, according to the present example wheels 211, of the dynamometer test units 310, 311 have been adjusted so that the wheels 211 of the dynamometer test units 110, 111 essentially are located on a circle having its center in the joint 220.

The dynamometer test units may be provided with support legs 206 that are adjustable in length so that the wheels 211 may be displaced in a direction substantially perpendicular to axis A of FIG. 2A. Alternatively or in addition the wheels 211 may be adjustable in a direction parallel to the axis A e.g. by adjustable portions 206A of the support legs. Hence, it can be assured that the wheels of the dynamometer test unit essentially rest on a circle having its center coinciding with center of the steering of the vehicle. In addition, the wheels 211 may advantageously be aligned such that the wheels 211 are positioned substantially on an axis passing through the center of steering of the vehicle 100, i.e. axis B of FIG. 2B. This is illustrated by axis D in FIG. 2C and axis E in FIG. 6. This is also schematically indicated from the side in FIG. 2B. Since the axis of rotation is not completely vertical in this example, the wheels 211 are preferably aligned with the axis of rotation B such that e.g. axis D in FIG. 2C and axis E in FIG. 6 intersect the axis of rotation B at floor level, i.e. where the wheels 211 contact the floor 230 in order to minimize lateral motion of the vehicle when turning the dynamometer test units.

When the dynamometer test units 110, 111 are rotated in this manner about the point that constitutes also the center of turning of the vehicle, there will be no or only little lateral motion of the vehicle when changing steering angle. That is, the lateral movement will essentially correspond to the lateral movement when wheels instead of dynamometer test units are attached to the vehicle. The more the wheels of the dynamometer test units deviate from an alignment according to the above, the greater will the lateral movement of the vehicle be when turning the dynamometer test units. It is not required that the wheels of the dynamometer test units are positioned as discussed, but as described this may be advantageous.

The difference in influence on the force exhibited by the steering mechanism due to the dynamometer test units 110, 111 in relation to the life driving may differ to different extents in dependence on the situation being simulated. For example, if the steering angle is changed only at a very slow rate the moment of inertia imposed on the steering angle may differ less in comparison to when a vehicle wheel is attached to the wheel hub in comparison to a situation where there is a quick change in steering angle since in this case the moment of inertia imposed on the steering mechanism by the dynamometer test unit may be considerable.

In order to alleviate the impact of the dynamometer test units 110, 111 in particular with regard to dynamic/rapid changes in the steering angle, the system disclosed in FIG. 3 comprises a rod assembly 300 comprising a linear actuator 301. The linear actuator 301 may consist of any suitable actuator means such as a hydraulically, pneumatically and/or electrically actuated cylinder. The rod assembly is attached by one end to dynamometer test unit 110 and by the opposite end to the dynamometer test unit 111 by means of joints.

According to the present example, the linear actuator 301 is capable of providing both a controllable pushing motion and a controllable pulling motion in the directions indicated by arrows 302. This may be accomplished e.g. by a double-acting cylinder, and/or two cylinders acting in opposite directions. Given the situation shown in FIG. 3, a pulling motion, thereby reducing the length of the rod assembly 300, e.g. by a piston being urged into a cylinder of the linear actuator 301, will cause the wheels 211 to move clockwise along the circles 310, 311, thereby obtaining a clockwise rotation of dynamometer test unit 110 about the joint 220. Conversely, a pushing motion, thereby increasing the length of the rod assembly 300, e.g. by a piston being pushed out of a cylinder of the linear actuator 301, will cause the wheels 211 to move anticlockwise along the circles 310, 311, thereby obtaining an anticlockwise turning motion of dynamometer test units 110, 111 about the joint 220, e.g. the motion illustrated in FIG. 2C.

Hence, when, during testing of the vehicle, a change in steering angle is requested, e.g. by means of a person controlling the vehicle steering wheel or, which may also be the case, a steering command being requested e.g. by the dynamometer test system and e.g. executed by means of actuator means located on the steering lever, the linear actuator 301 may apply a force influencing the turning of the dynamometer test units 110, 111 to thereby influence the steering resistance exhibited by the vehicle. For example, if the dynamometer test units 110, 111 provide a force/resistance acting against the requested change in steering angle that is higher than would be the case during real life driving, which oftentimes is the case in particular with regard to dynamic/rapid steering commands, the linear actuator 301 may provide a force that strives to rotate the dynamometer test units 110, 111 in the desired direction, thereby reducing the force applied by the dynamometer test units on the vehicle as exhibited by the vehicle. In this way, e.g. transient or rapid changes in steering direction that otherwise would not fully behave as in real life driving given the weight of the dynamometer test units may be performed in a manner that more resembles the real-life behavior. In this way, further tests of the vehicle using the vehicle dynamometer system may be performed.

With regard to the exemplary embodiment shown in FIG. 3, both dynamometer test units 110, 111 are influenced by the linear actuator 301. This means that the vehicle steering linkage need not be connected to allow tests to be performed. That is, the vehicle steering linkage must not connect the right and left wheel hubs, but the linkage may be disconnected should this be desired from a testing point of view. For example, the vehicle steering linkage may be disconnected to effectuate a control of steering angles through the use of the dynamometer test system, e.g. using the force applying means according to the invention, such as through the use of rod assembly 300 to accomplish the desired steering angle changes instead of using the steering wheel of the vehicle.

Furthermore, since both dynamometer test units 110, 111 are influenced by the similar but opposite component forces according to embodiment of FIG. 3, the total force vector of the component forces applied by the linear actuator is essentially zero, and hence has little or no impact on the vehicle motion. That is, the vehicle may be tested e.g. without being secured against lateral motion, since essentially no such forces are applied.

FIG. 4 illustrates a further exemplary vehicle dynamometer system according to embodiments of the invention. In this example, only dynamometer test unit 111 is influenced by a linear actuator 401. A first end of the linear actuator 401 is connected to e.g. a support 206 of the dynamometer test unit 111, while the other end is affixed e.g. to the floor of the premises in which the test is carried out or any other suitable and available fixing point. The linear actuator 401 may operate similarly to the linear actuator 301, and hence comprise a double-acting cylinder providing both a pulling and pushing force on the dynamometer test unit 111 to influence the force exhibited by the vehicle upon a change of steering angle in a similar manner as has been described above. According to the disclosed example, only one dynamometer test unit 111 is influenced, which means that the vehicle steering linkage 402 needs to be connected so that the dynamometer test unit 110 may also be influenced by linear actuator 401 via the vehicle steering linkage 402.

With regard the embodiment disclosed in FIG. 4, the vehicle 100 may have to be secured against lateral motion, e.g. using tow bar and/or tow hooks 403 and straps such as ratchet straps to secure the vehicle to ground to avoid undesired lateral motion during testing. Whether such motion may occur or not may depend on the friction, and hence force, required to move the dynamometer test units in relation to moving the vehicle. According to the embodiment disclosed in FIG. 4, the force will be either pushing or pulling, and thereby automatically have a resulting force vector in a lateral direction that may give rise to lateral movement of the vehicle.

Figure 5:
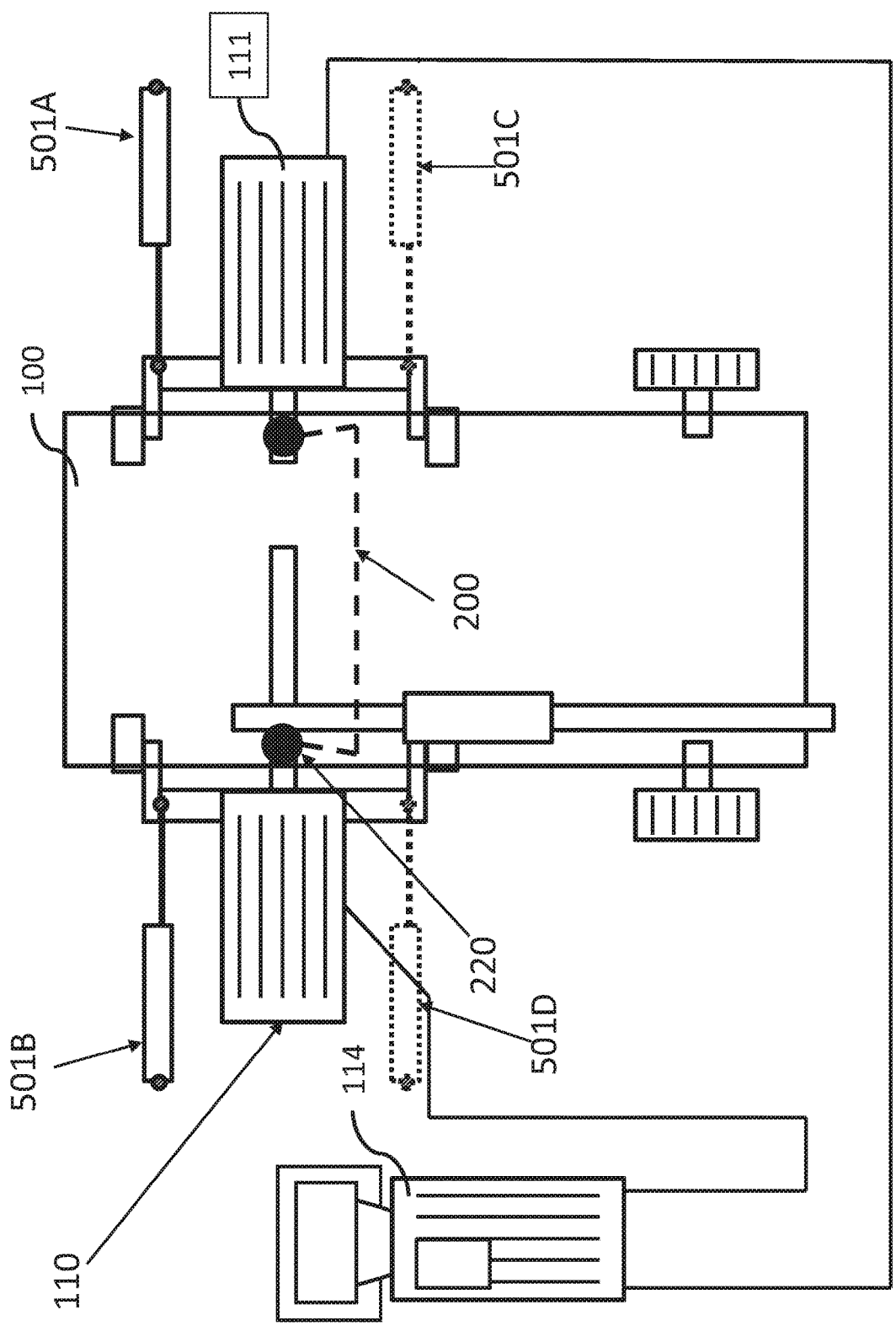
FIG. 5 illustrates a further exemplary vehicle dynamometer test system according to embodiments of the present invention.

FIG. 5 discloses an embodiment similar to the embodiment disclosed in FIG. 4 however with the difference that both dynamometer test units 110, 111 are each influenced by a linear actuator 501A, 501B. This embodiment provides the same features as that of FIG. 3 with the addition that since both dynamometer test units are influenced by force applying means, the vehicle steering linkage 200 may be disconnected if so is desired. This also applies to the embodiment described in FIG. 3.

The vehicle 100 of FIG. 5 may also have to be secured against lateral motion according to the above to avoid undesired lateral motion during testing. According to the embodiment disclosed in FIG. 5, the linear actuator 501B may provide a pushing force while the linear actuator 501A may provide a pulling force. Thereby the resulting force vector in the lateral direction will be non-zero with the possible requirement of securing the vehicle against lateral motion during testing. If, instead, e.g. four linear actuators are used, such as e.g. indicated in FIG. 5 by linear actuators 501A-D, a resulting force vector of essentially zero may be obtained. This is also the case if e.g. linear actuators 501B,C are used to provide the forces. This also applies to pair 501A, 501D.

Figure 6:
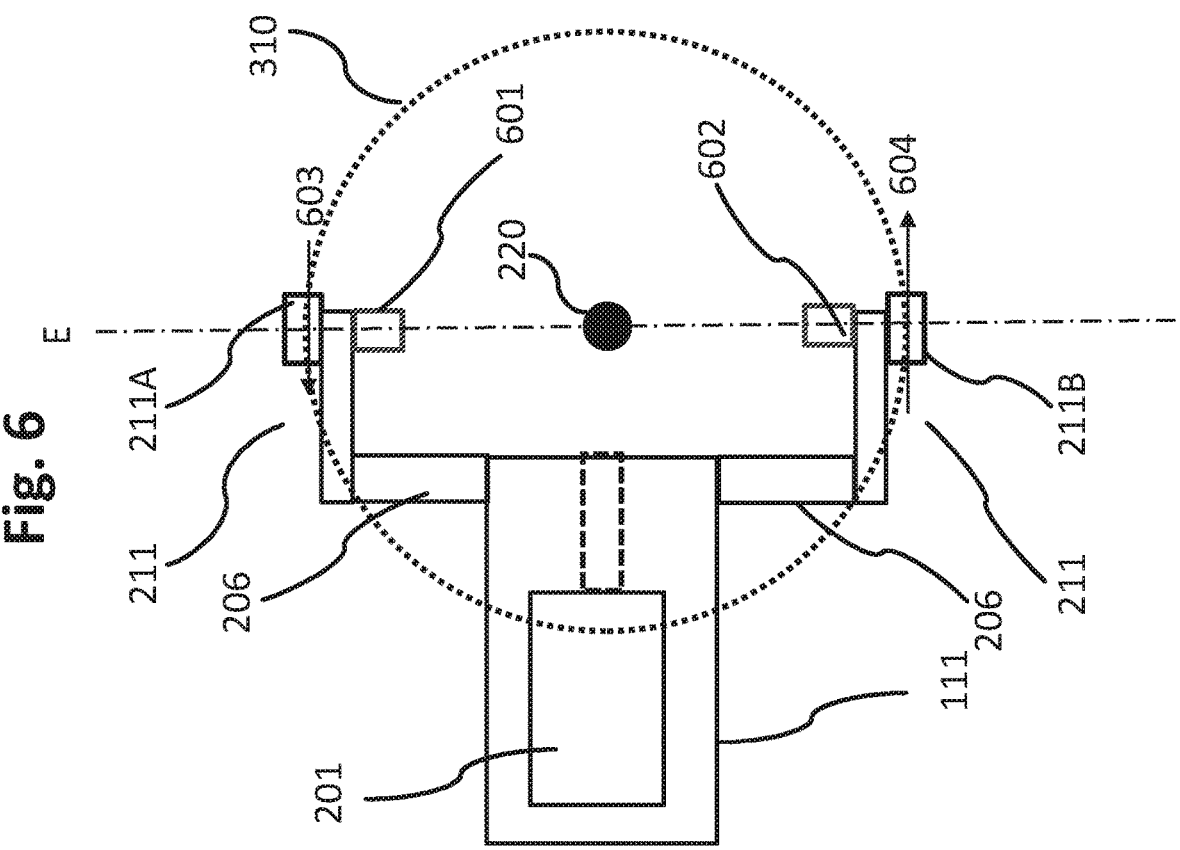
FIG. 6 illustrates a further exemplary vehicle dynamometer test system according to embodiments of the present invention.

FIG. 6 illustrates a further example of a dynamometer test unit according to embodiments of the invention. According to the disclosed embodiment, e.g. electrical motors 601, 602 are arranged to provide a propelling force to the wheels 211A and 211B, respectively, of the dynamometer test unit 111. For example, the electric motor 601 may propel wheel 211A in the direction of arrow 603 while the electric motor 602 may propel wheel 211B in the direction of arrow 604 to obtain the rotation illustrated in FIG. 2C. The embodiment of FIG. 6 apply force components having a resulting force being essentially zero in the lateral direction, since the wheels are propelled in opposite directions. The vehicle may hence be tested without being secured against lateral motion.

Figure 7:
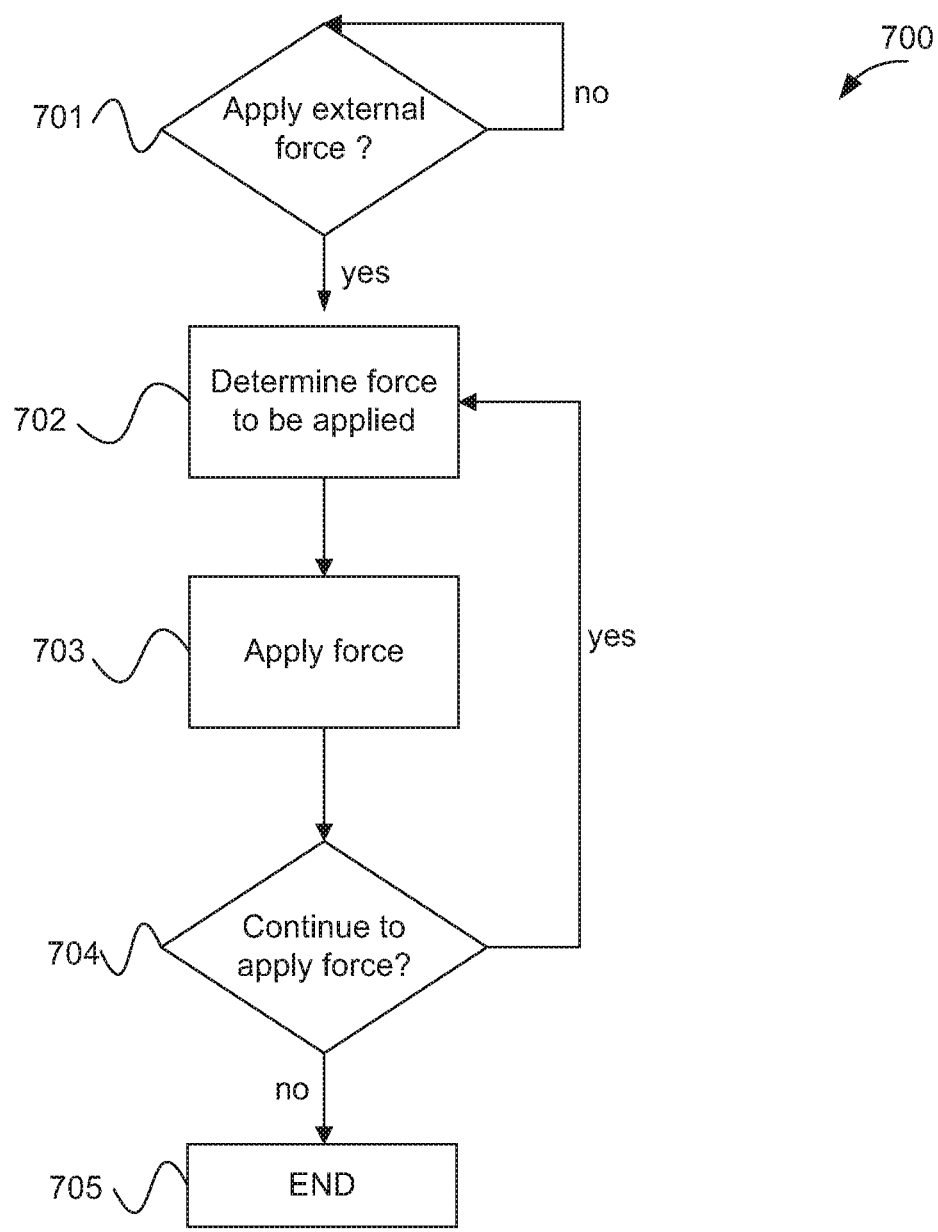
FIG. 7 illustrates an exemplary method according to embodiments of the present invention.

FIG. 7 illustrates a method 700 for testing a vehicle according to the invention. The method 700 is exemplified with reference to the embodiment of FIG. 3. In step 701 it is determined whether an external force is to be applied to a dynamometer test unit using force applying means, in the present example the linear actuator 301. If so, the method continues to step 702 to determine force to be applied.

With regard to the force being applied by the linear actuator 301 this may be determined in various ways. For example, the linear actuator 301 may be of a design that senses a force being applied by the dynamometer test unit. This may occur when the dynamometer test units begin to turn in response to a steering command, thereby generating a pulling or pushing motion on the linear actuator. When this (force) is sensed by the linear actuator, e.g. by suitable sensing means arranged on the linear actuator, the linear actuator 301 may respond to this by applying a force that is arranged to amplify the sensed force, hence providing a force having a magnitude being dependent on the sensed force. That is, if a pushing force is sensed, this force can be amplified to facilitate the rotation of the dynamometer test unit. The linear actuator 301 may e.g. also be arranged to provide a force corresponding to the sensed force. The sensed force is caused by the turning motion, and by applying a force in the same direction as the sensed force, the wheel hub is relieved, e.g. essentially completely from the resistance against turning imposed by the dynamometer test unit.

As was mentioned above, the dynamometer test units 110, 111 may in addition or alternatively be provided with means for measuring the torque that the dynamometer test unit is subjected to when being turned/moved by steering angle changes of the wheel hub. That is, the turning motion about axis B in FIG. 2B, i.e. the motion along arrow 231 in FIG. 2C. The torque may be measured, for example, using strain gauges on the bearing housing 232 in which the output shaft of the dynamometer test unit is placed in bearings.

This measured torque may then be utilized when applying the external force by the linear actuator 301, so that the force applied by the linear actuator 301 can be controlled using the torque experienced by the dynamometer test unit 110, 111 as input signal.

In this way, the torque exhibited by the vehicle steering mechanism can be controlled to essentially any desired torque.

Hence, for example, if a steering command is requested that would cause the vehicle during real life driving to turn right when moving in a forward direction, i.e. providing a clockwise rotation about the joint 220, the clockwise rotation of the dynamometer test units 110, 111 will provide a force sensed by the linear actuator 301 in which case the linear actuator may provide a pulling force facilitating the rotation of the dynamometer test units in the ongoing direction of turning.

Conversely, if the steering command requests a steering wheel angle change in the opposite direction i.e. anticlockwise, the linear actuator 301 may instead provide a pushing force, in order to extend the length of the rod assembly 300.

The applied force may further be dependent on the speed at which the steering angle changes so that e.g. the linear actuator 301 may apply higher force for higher speeds of change of steering angle, i.e. for a higher rate of change of the force sensed by the linear actuator.

The force applying mean may also be controlled on the basis of e.g. a signal representing the requested steering angle change, which e.g. can be obtained by arranging a sensor on the steering column or in any other suitable location.

It is also possible to calculate the force to be applied by the linear actuator 301. This may be accomplished, for example, using tire models describing the forces acting against the surface, e.g. road, that the tire contacts when the vehicle is maneuvered. Such tire models may be available e.g. by the manufacturer of the tire or be otherwise determined. Furthermore, such tire models may or may not provide a model of the force that the wheel is subjected to during turning, but at least a force as a function of vehicle speed may be determined using these tire models, so that hence at least the simulated vehicle speed may be accounted for. The resulting force obtained using the tire model may then be utilized to control the force applying means to apply a suitable force. A model of the force acting between wheel and surface may also be determined e.g. using empirical measurements, where a resulting force may be estimated for various speeds and steering angle changes, where these measurements may then be utilized to control the force applying means to apply a suitable force.

According to embodiments of the invention, vehicle speed dependent changes in steering resistance are accounted for. This may, for example, be accomplished by applying a higher force that assist in the rotation of the dynamometer test units for higher simulated vehicle speeds than for lower simulated vehicle speeds. This is because, for example, the friction between tire and surface in general is higher when the vehicle is standing still than when traveling at higher speeds, and thereby the resistance exhibited by the steering mechanism being higher at standstill.

When a force to be applied has been determined in step 702, the force is applied by the force applying means, step 703. It may then be determined, step 704, if a force is to remain applied, in which case the method returns to step 702 to re-determine the force to be applied, so that e.g. changes in rate-of-change of the steering angle can be accounted for. When a force no longer is to be applied the method is ended in step 705. Alternatively, the method may return to step 701 to be ready for next time a force is to be applied.

Furthermore, there may exist a desire to know the degree to which the wheels of the vehicle have actually turned during testing e.g. as a result of a turning of the steering wheel of the vehicle. In particular, this may be used as input to a vehicle model being used in the testing of the vehicle.

It is in general a desire to avoid attaching various additional measurement devices on the vehicle as much as possible other than the dynamometer test unit when performing measurements. It takes time to connect various measurement means, and there is also a risk that the measurement results are not sufficiently accurate.

For example, it may be difficult to determine a current steering angle of the vehicle wheels from a determination of a turning of the vehicle steering wheel. Oftentimes there is a gearing between steering wheel and vehicle wheel, where the gear ratio may not be fixed but be subject to a change e.g. through the use of a steering servo system. A measurement of the steering wheel motion may therefore result in a reduced accuracy in the measurement of the actual wheel steering angle.

Vehicles oftentimes comprise a vehicle model that act on input parameters such as turning radius and relative wheel speed, and inaccuracies in the measurements of wheel steering angle may have a substantial impact on the vehicle model, e.g. when large turning actions are to be performed, i.e. turning along a small turning radius (e.g. at maximum steering angle). The difference in speed of rotation of the vehicle wheels will then be substantial due to the large relative difference in turning diameter that the wheels follow. If, in this case, the difference in speed of rotation of the wheels does not correspond to the turning radius, the vehicle stability system may engage and e.g. apply brake forces to the vehicle wheels. For example, testing of parking maneuvers may be difficult if the actual steering angle is not known with a sufficient accuracy, since e.g. vehicle stability systems may counteract the maneuvers that are being performed so that real life behavior may not accurately be reflected.

According to embodiments of the invention, the real turning motion of the vehicle wheels (wheel hubs) can be accurately deduced using the method and system according to the invention. The actual turning of the vehicle wheels may be determined, for example, by determining a movement of the dynamometer test unit caused by the force applying means. For example, a movement of force applying means in the form of e.g. one or more linear actuators may be determined, and utilized to calculate a corresponding wheel steering angle change from this movement.

With regard to the embodiment disclosed in FIG. 6, where the dynamometer test unit wheels are propelled by motors, e.g. encoders arranged on the motor shafts propelling these wheels may be used to deduce the motor motion and thereby dynamometer test unit wheel motion, whereafter the angular turning motion of the dynamometer test unit, and thereby the vehicle wheel, can be calculated. Alternatively, for example, encoders detecting motion of the dynamometer test unit wheels may also be utilized to count revolutions from which the vehicle wheel turning motion may be calculated.

According to embodiments of the invention, a separate encoder arranged on the dynamometer test unit may be utilized, and which e.g. may comprise a wheel contacting the surface on which the dynamometer test unit is resting. The encoder wheel may be configured to rotate with a turning motion of the dynamometer test unit, thereby providing a direct measurement of the movement of the dynamometer test unit which may then be translated into a steering angle change of the vehicle wheel.

The calculation of a corresponding wheel steering angle change can be determined in a straight-forward manner, for example through the knowledge of the distance to the measuring wheel from the center of rotation of the vehicle wheel. The measuring wheel may e.g. consist of rubber or any other suitable material capable of providing a relatively high degree of friction against the surface on which the dynamic test unit is resting to thereby prevent wheel slipping which otherwise may negatively impact the accuracy of the measurement of the turning motion.

When the vehicle wheel steering angle have been determined in this manner, and thereby current vehicle turning radius, vehicle wheel speeds may be accurately set using the dynamometer test units so that e.g. vehicle stability systems does not interact in situations where this is not called for.

Consequently, accuracy in testing with regard to correspondence of the wheel steering angle and wheel speed with the conditions that would prevail had the vehicle been used in real life driving may be improved.

Finally, according to the above described example, each dynamometer test unit comprises a single power source consisting of an electrical machine. According to one embodiment, the dynamometer test unit comprises two or more individually controllable power sources, which can be electrical machines, hydraulic pumps or any suitable combination thereof. If two or more power sources are used for a single dynamometer test unit, the moment of inertia can be separately determined for the power sources so that only moment of inertia (power sources) currently participating in the measurements are used when compensating the results.

Above, the present invention has been exemplified in connection with testing of a particular kind of vehicle. Naturally, the present invention is applicable for testing of any kind of vehicle, such as a conventional two or four-wheel drive combustion engine vehicle, or any other kind of hybrid vehicle other than what has been disclosed above, for as long that at least one of the tested wheel shafts are used for changing steering direction of the vehicle. Consequently, more than two dynamometer test units can be used for being connected to more than two wheels, and it is also contemplated that only one wheel shaft is connected to a dynamometer test unit.

For example, vehicles comprising more than one axle provided with steering wheels may be tested. One or more wheels of a front axle and one or more wheels of a rear axle of the vehicle may comprise steered wheels, and wheels of front axle and rear axle may simultaneously be tested using dynamometer test units controlled according to the invention. For example, any of the above embodiments may be utilized e.g. on a rear axle of the vehicle as well as on the front axle of the vehicle. For example, the vehicle may be equipped with four-wheel steering, in which case e.g. all steered wheels may be tested e.g. according to any of the above embodiments, where different embodiments may be utilized for e.g. front axle and rear axle.

As is apparent from the above, the term power source means a power source that is capable of subjecting a wheel shaft to a power (torque), be it a propelling (positive) torque or braking (negative) torque or a combination of both.

The present invention can be implemented e.g. in the measuring and control system 114. The method can further be realized by the use of programmed instructions. These programmed instructions typically consist of a computer program which, when it is executed in a computer or control unit, causes the computer/control unit to perform the desired control, such as method steps according to the present invention.

The computer program is usually part of a computer program product, where the computer program product comprises a suitable storage medium with the computer program stored on said storage medium. Said storage medium can be a non-transient storage medium.

Finally, it should be understood that the present invention is not limited to the embodiments described above, but relates to and incorporates all embodiments within the scope of the appended independent claims.

The invention claimed is:

1. Method for use in dynamometer testing of a vehicle having a steering mechanism for changing steering angle of a wheel hub connected to a first wheel shaft,
the method including:
in use, applying a torque to said first wheel shaft using a first controllable dynamometer power source of a vehicle dynamometer test unit rigidly connected to said wheel hub,
wherein a change of steering angle of said wheel hub rotates said rigidly connected first dynamometer test unit, characterized in the method including, when changing steering angle of said wheel hub:
applying an external force acting on the dynamometer test unit to influence the force required by the vehicle steering mechanism to change steering angle of said wheel hub.

2. Method according to claim 1, wherein:
the applied external force acts to rotate the dynamometer test unit when changing steering angle of said wheel hub in the direction of motion the dynamometer test unit is being rotated by turning the wheel hub.

3. Method according to claim 1, wherein:
the applied external force reduces the force required by the vehicle steering mechanism to change steering angle of said wheel hub.

4. Method according to claim 1, further including:
determining the external force applied to the dynamometer test unit based on a vehicle speed being simulated during testing.

5. Method according to claim 4, further including:
applying a higher external force to the dynamometer test unit for a first simulated vehicle speed than for a second, lower than said first, simulated vehicle speed such that the force required by the vehicle steering mechanism to change steering angle of said wheel is lower for said first simulated vehicle speed than for said second simulated vehicle speed.

6. Method according to claim 1, further including:
applying a higher external force for a first speed of change of steering angle of the wheel hub in comparison to an applied external force for a second, lower than said first, speed of change of steering angle.

7. Method according to claim 1, further including:
determining said force to be applied to the dynamometer test unit on the basis of a mathematical representation of a force acting between an attached wheel of the wheel shaft being tested and the surface upon which the wheel is resting during real-life driving of the vehicle.

8. Method according to claim 1, further including:
adjusting a position of a pair of supporting means, such as a pair of wheels, of said dynamometer test unit to substantially be positioned on the periphery of a circle having a center in the center of rotation of said wheel hub, and wherein said pair of support means are adjusted to be substantially aligned on opposite ends of a diameter of said circle passing through a center of rotation of said wheel hub, such that said supporting means of the dynamometer test unit, when the dynamometer test unit is rotated by a steering angle change, moves substantially along said periphery of said circle.

9. Method according to claim 1, further including, when dynamometer testing a vehicle:
performing said dynamometer testing without securing the vehicle to a support upon which vehicle and/or dynamometer test unit is resting.

10. Method according to claim 1, further including, when testing a vehicle comprising a steering mechanism for changing steering angle of wheel hubs of at least two steered wheel shafts, and where dynamometer test units are connected to said least two steered wheel hubs:
applying external forces to said dynamometer test units such that the resultant of the component forces is substantially zero.

11. Method according to claim 1, further including:
measuring the torque that the dynamometer test unit is subjected to when being rotated by, steering angle changes of the wheel hub, and
controlling the external force acting on the dynamometer test unit based on the measured torque.

12. Method according to claim 1, further including:
determining a steering angle and/or steering angle change of said wheel hub by determining a motion of the dynamometer test unit.

13. Method according to claim 12, further including:
determining the motion of the dynamometer test unit by determining a motion of said force applying means.

14. Method according to claim 12, further including:
determining the motion of the dynamometer test unit using motion detecting means arranged on the dynamometer test unit.

15. Computer program comprising a program code which, when said program code is executed in a computer, causes said computer to perform the method according to claim 1.

16. Computer program product comprising computer-readable medium and a computer program according to claim 15, wherein said computer program is included in said computer-readable medium.

17. Vehicle dynamometer system for dynamometer testing of a vehicle having a steering mechanism for changing steering angle of at a wheel hub connected to a first wheel shaft,
said vehicle dynamometer system comprising:
a dynamometer test unit having a first controllable dynamometer power source to be rigidly connected to a wheel hub of the vehicle being tested, the first controllable dynamometer power source being arranged to, during testing, applying torque to said wheel hub, the vehicle dynamometer system being characterized in:
force applying means, said force applying means being configured to, during testing, when an output shaft of said dynamometer power source is rigidly connected to a wheel hub of a vehicle, apply a force acting on the dynamometer test unit to rotate the dynamometer test unit in a horizontal plane about a rotation joint of said wheel hub.

18. Vehicle dynamometer system according to claim 17, said force applying means being configured to, when said dynamometer test unit is rigidly connected to a wheel hub, apply said force to influence a force required by a vehicle steering mechanism to change steering angle of said wheel hub.

19. Vehicle dynamometer system according to claim 17, wherein:
the force applying means comprises at least one linear actuator, one end of said linear actuator being configured to be connected to said dynamometer test unit, the force being applied to said dynamometer test unit by activating said linear actuator.

20. Vehicle dynamometer system according to 19, the linear actuator being a double-acting linear actuator arranged to apply a pulling force and/or a pushing force to said dynamometer test unit.

21. Vehicle dynamometer system according to claim 20, one end of said linear actuator being configured to, in use, be connected to a first dynamometer test unit, and an opposite end of said linear actuator being configured to be connected to a second dynamometer test unit, said second dynamometer test unit being configured to, in use, be connected to a second steered wheel shaft of the vehicle being tested, so as to simultaneously apply a rotating force to said first and second dynamometer test units, respectively.

22. Vehicle dynamometer system according to claim 17, wherein:
said dynamometer test unit comprises at least one wheel, said force applying means comprising a motor configured to propel said wheel, said force applying means being configured to rotate the dynamometer test unit in a horizontal plane about said joint by propelling said wheel.

23. Vehicle dynamometer system according to claim 17, wherein the dynamometer test unit is arranged to be standing freely on a surface and connected to the vehicle by means of a rigid coupling to the wheel shaft, while supporting the weight of the vehicle by means of said rigid coupling.

24. Vehicle dynamometer system according to claim 17, wherein:
   the vehicle dynamometer system comprises at least two dynamometer test units,
   the force applying means are configured to provide component forces to the at least two dynamometer test units, wherein the force applying means are configured to provide a first component force to a first dynamometer test unit of the at least two dynamometer test units, and a second component force to a second dynamometer test unit of the at least two dynamometer test units, such that the resultant of the component forces is substantially zero.

25. Vehicle dynamometer system, according to claim 17, wherein:
   the three applying means comprising first force applying means configured to apply a first component force to a first dynamometer test unit, and a second force applying means configured to apply a second component force to a second dynamometer test unit.

* * * * *